United States Patent [19]

Shaw et al.

[11] Patent Number: 5,577,539
[45] Date of Patent: Nov. 26, 1996

[54] DRUM-TOP DRAINFIELD FUNNEL

[76] Inventors: Mark D. Shaw, 9820 Preston Trail, Ponte Vedra Beach, Fla. 32082; J. Tad Heyman, 11858 Olde Oaks Ct. N., Jacksonville, Fla. 32223; Laurence M. Bierce, 105 Sandra Rd., Jacksonville, Fla. 32211; Jesse Ehredt, 1711 Duffton La., Painesville, Ohio 44077

[21] Appl. No.: 342,305

[22] Filed: Nov. 18, 1994

[51] Int. Cl.⁶ .................................................. B67C 11/00
[52] U.S. Cl. ........................ 141/332; 141/333; 141/339; 141/106; D7/700; D23/200; D15/150; 220/287; 220/571
[58] Field of Search .................................. 141/331–333, 141/339–342, 98, 106, 364, 375; 184/106; 220/571–573, 287; D7/700; D15/150–152, 199; D23/200

[56] References Cited

U.S. PATENT DOCUMENTS

| 478,303 | 7/1892 | Allgood | 141/332 X |
|---|---|---|---|
| 483,664 | 10/1892 | Aborn | 141/106 |
| 578,671 | 3/1897 | Wisdom | 141/106 |
| 1,441,712 | 1/1923 | Picard | 220/287 |
| 1,515,537 | 11/1924 | Ashton | 141/340 |
| 1,655,021 | 1/1928 | Nord | 141/333 |
| 1,667,075 | 4/1928 | Lippold | 141/106 |
| 2,546,104 | 3/1951 | MacGregor | 220/287 X |
| 3,211,195 | 10/1965 | Porter | 141/331 X |
| 4,832,095 | 3/1989 | Bonnell | 141/106 |
| 5,062,552 | 11/1991 | Heubel | 220/287 X |
| 5,143,178 | 9/1992 | Latham, Jr. | 184/106 |
| 5,219,006 | 6/1993 | Bishop | 141/331 X |
| 5,291,921 | 3/1994 | Devine | 141/332 X |
| 5,415,210 | 5/1995 | Hannah | 141/333 |

FOREIGN PATENT DOCUMENTS 3937038  10/1990  Germany ......................... 141/333

*Primary Examiner*—J. Casimer Jacyna
*Attorney, Agent, or Firm*—Thomas C. Saitta

[57] ABSTRACT

A drainfield funnel suitable for use with either 55 gallon or 30 gallon drums, the funnel comprising a bottom having two drum rim receiving channels, one sized to correspond to a 55 gallon drum and the other sized to correspond to a 30 gallon drum, a perimeter lip, a funnel surface sloping to a spout and a generally horizontal drainfield surface formed by a number of discrete object support members, where preferably the linear openings between the object support members are relatively limited.

21 Claims, 2 Drawing Sheets

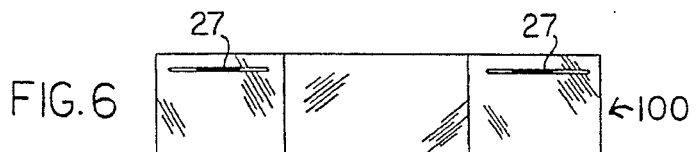
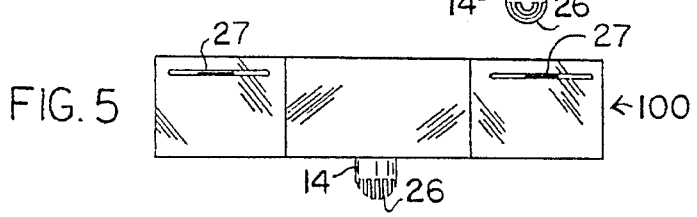
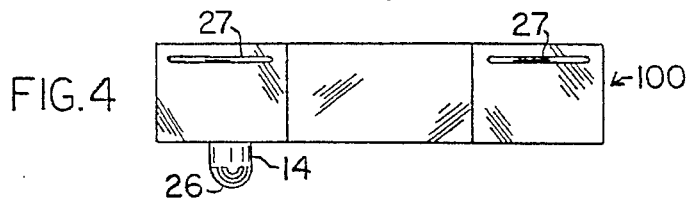
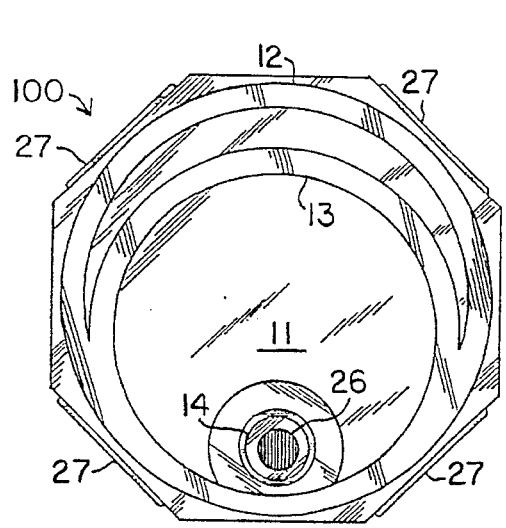
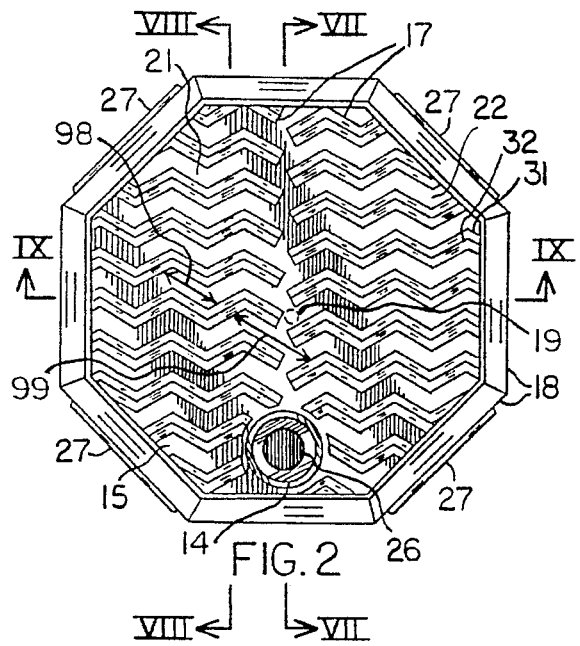
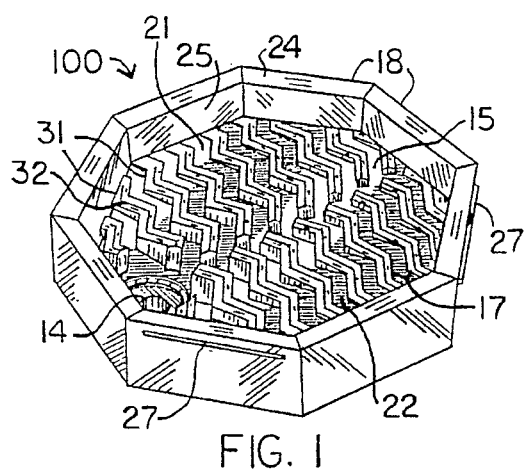

FIG. 7
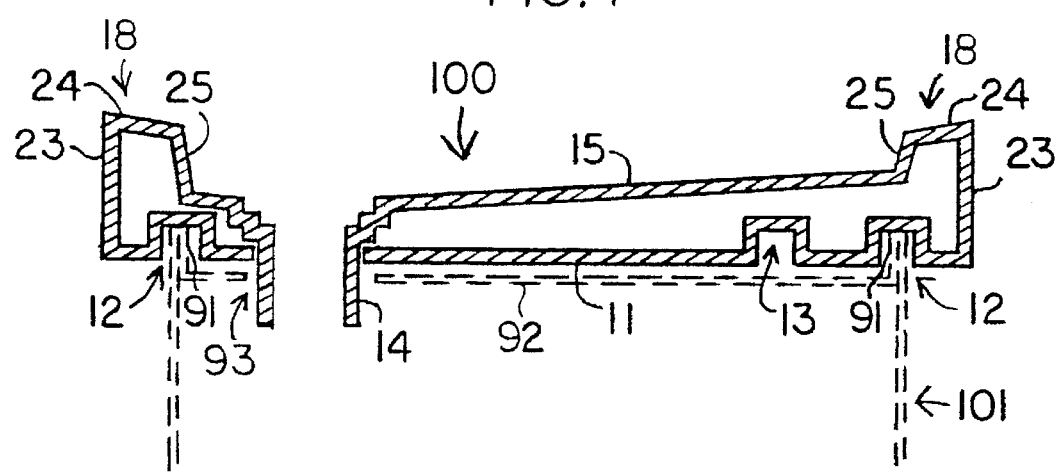
FIG. 8
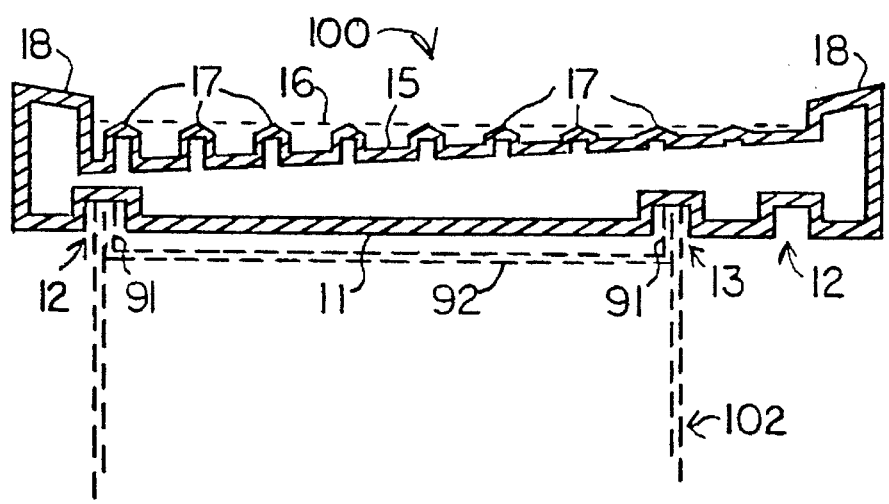
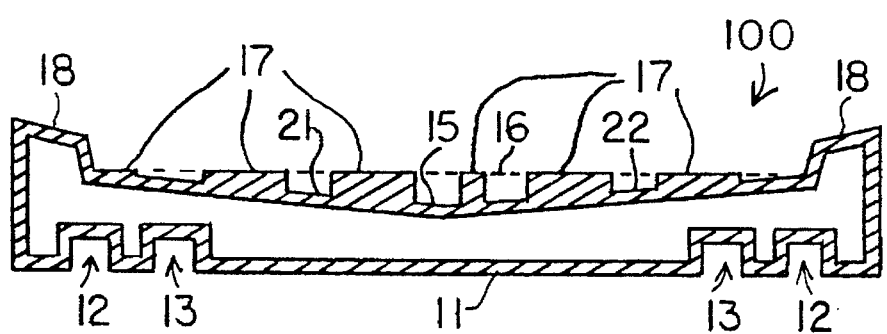
FIG. 9

DRUM-TOP DRAINFIELD FUNNEL

BACKGROUND OF THE INVENTION

This invention relates generally to the field of funnels adapted for use with large drums or barrels. More particularly, the invention relates to such funnels which rest on the drums in a stable manner and which can support objects to be drained of liquid into the drums. Even more particularly, the invention relates to such funnels which are structured to cover the entire lid of the drum, are structured to fit multiple size drums, are structured to support the objects to be drained on a horizontal drainfield surface above a sloping funnel surface, are structured to support objects with either flat profiles or bottle necks, and are structured to prevent small linear objects from dropping through the drainfield surface to the funnel surface.

Large drums for the storage or transport of liquids are well known, usually being constructed of metal or plastic, sized to hold either 30 or 55 gallons of liquid and designed with flat tops and bottoms for stacking and standing the drums. Access to the interior of the drums is accomplished through a small diameter opening in the lid—the lid being a generally planar surface with an annular vertical lip. Obviously, to put liquids into such drums through the small opening a nozzle or funnel is preferred to prevent spillage. Funnels have been developed which rest on the drum top itself so that the operator does not need to hold the funnel in place while pouring. Likewise, since the drums are often used as large volume containers for waste liquids, such as used oil or chemicals, funnels having large openings and raised lips are known. Finally, since many of the waste products require time to drain from their primary containers, such as for example motor oil containers or oil filters, funnels with drainfield surfaces have been developed.

Such drainfield funnels as currently known suffer from several drawbacks. A typical drainfield funnel for a drum has a spout to be inserted into the small opening in the drum lid, a sloping funnel surface to direct the liquid to the spout, and raised linear ridges forming a drainfield surface to support small objects to be drained. These drainfield funnels are sized to fit within the vertical lip of the drum top, which means that any liquid spilling down the outside of the funnel ends up on the drum lid. Such funnels cannot be used with open top drums. To drain bottles, special racks must be utilized. The linear ridges do not support linear objects or prevent such objects from falling to the messy funnel surface.

It is an object of the present invention to provide a drainfield funnel suitable for use with either 55 or 30 gallon drums which do not suffer the drawbacks and problems associated with the known funnels, to provide such a funnel which covers the entire lid of the drum, to provide such a funnel which can be used with either open top or closed top drums, to provide such a funnel which has a horizontal object support drainfield surface with a sloped funnel surface, to provide such a funnel which can retain bottles in a draining position, and to provide such a funnel with non-linear drain ridges forming the drainfield surface.

SUMMARY OF THE INVENTION

The invention comprises a drainfield funnel for use with 55 or 30 gallon drums having either an open top or a closed top with a small diameter opening, the drainfield funnel comprising a bottom having two drum lip receiving channels or recesses, a depending spout adapted to fit within the small diameter opening of a closed top drum, a funnel surface sloping downward from the perimeter of the funnel to the spout, a generally horizontal and planar object support drainfield surface comprised of the tops of a number of non-linear ridges extending upwardly from the funnel surface, and a raised lip around the upper perimeter of the funnel.

Preferably, the two drum lip receiving channels intersect such that the location of the spout is properly positioned for either a 55 or 30 gallon drum, with the larger drum lip receiving channel corresponding to the former and the smaller drum lip receiving channel corresponding to the later. The funnel surface is preferably constructed to slope both downward to the spout and also to a line bisecting the funnel and extending through the spout. The raised non-linear ridges forming the drainfield surface extend generally perpendicular to the line bisecting the funnel and extending through the spout without crossing the line, such that the ridges extend from the perimeter to the bisecting line, the ends of the ridges creating a number of receiving areas along the bisecting line for supporting bottle necks.

BRIEF DESCRIPTION OF THE DRAWINGS

FIG. 1 is a perspective view of the invention.

FIG. 2 is top view of the invention.

FIG. 3 is a bottom view of the invention.

FIG. 4 is right side view of the invention.

FIG. 5 is a front side view of the invention.

FIG. 6 is a left side view of the invention.

FIG. 7 is a cross-sectional view taken along line VII—VII of FIG. 2, illustrating the invention in combination with a 55 gallon drum.

FIG. 8 is a cross-sectional view taken along line VIII—VIII of FIG. 2, illustrating the invention in combination with a 30 gallon drum.

FIG. 9 is a cross-sectional view taken along line IX—IX of FIG. 2.

DETAILED DESCRIPTION OF THE INVENTION

With reference to the drawings, the invention will now be described in detail with regard to the best mode and preferred embodiment. As shown in the figures, the invention generally comprises a drainfield funnel 100 having a bottom 11, a first drum receiving channel or recess 12, a second drum receiving channel or recess 13, a spout 14, a sloping funnel surface 15, a generally horizontal support drainfield surface 16, object support members 17, a peripheral lip 18, and bottle neck receiving areas 19. The invention is adapted to be used in combination with the rim 91, top surface 92 and aperture 93 of either a 55 gallon drum 101 or a 30 gallon drum 102, although it is contemplated that the invention could be sized to accommodate any size drum. The invention can be formed of any suitable material having the required properties of rigidity, strength, liquid impermeability and high resistance to corrosives and contaminants. The invention is shown as being made of rigid plastic formed with thin walls and an open interior, but the invention could be formed as a solid unit of plastic, metal or other material.

The overall diameter of the invention is adapted to exceed the overall diameter of a drum 101, such that any liquid which is spilled outside of the drainfield funnel 100 will not collect on the drum top surface 92. A raised lip 18 extends around the perimeter of the funnel surface 15 to prevent the liquid poured into the funnel 100 from spilling or splashing down its exterior and onto the drum top surface 92. In the preferred embodiment, lip 18 has an outer diameter greater than 23 inches and comprises a lip outer wall 23 which is generally vertical, a lip upper surface 24 which preferably slopes downward toward the interior of the funnel 100, and a generally vertical lip inner wall 25. As seen in FIGS. 7 and 8, any liquid splashing onto lip 18 will be directed into the interior by lip upper surface 24, and any liquid splashing over lip 18 and flowing down lip outer wall 25 will not be collected on the top surface 92 of either drum 101 or 102.

The bottom 11 of funnel 100, as shown in FIGS. 3, 7, 8 and 9, is a generally flat surface with a downward depending spout 14 and two intersecting annular channels or circular recessed areas, first drum rim receiving channel or recess 12 and second drum rim receiving channel or recess 13. The spout 14 is adapted to fit within the standard aperture 93 of a drum 101 or 102, and preferably has strainer means 26 comprising a number of slits or openings to allow liquid to pass but retain any solid objects, such that the two receiving channels or recesses 12 and 13 encircle the spout 14 and the distance between the spout 14 and the intersection of the two channels 12 and 13 is shorter than the distance between the spout 14 and any other point on the two channels 12 and 13. Spout 14 receives the liquid from funnel surface 15 and conducts it into the interior of drum 101 or 102. The two receiving channels 12 and 13 are of different diameters and are offset such that they have a single intersection at the area on the bottom 11 closest to the spout 14. Thus the center point of channel 12 will be at a different location than the center point of channel 13. The diameter of first receiving channel 12 is sized to correspond to the diameter of the rim 91 of a 55 gallon drum 101 (approximately 23 inches), as shown in FIG. 7, while the diameter of second receiving channel 13 is sized to correspond to the diameter of the rim 91 of a 30 gallon drum (approximately 18.5 inches), as shown in FIG. 8. The apertures 93 of both 55 gallon drums 101 and 30 gallon drums 102 are by industry standard located the same approximate distance from the drum rim 91. By locating receiving channels 12 and 13 on the bottom 11 of funnel 100 such that they intersect at the point on the drum rim 91 nearest to the spout 14, the invention can be utilized with either 55 gallon drum 101 or 30 gallon drum 102 since the spout 14 of funnel 100 will fit into either drum aperture 93.

The working surface of the drainfield funnel 100 within lip 18 comprises a funnel surface 15 and a drainfield surface 16. Funnel surface 15 slopes such that the liquid will flow down funnel surface 15 and into spout 14. In the preferred embodiment, as shown in FIG. 9, funnel surface 15 is comprised of a first slope 21 and a second slope 22, the two slopes 21 and 22 meeting at a juncture on a line passing through the center of spout 14 and the center point of the funnel 100, with first slope 21 sloping downward laterally from one side of lip 18 toward the juncture and second slope 22 sloping downward laterally from the opposite side of lip 18 toward the juncture, and with the juncture itself sloping downward toward spout 14.

The drainfield surface 16 is a generally horizontal surface located above the funnel surface 15 and is formed by the upper surfaces of a number of discrete object support members 17, as seen in FIGS. 81 and 9. The drainfield surface 16 is used to support objects which need to have liquid drained from them, such as for example used oil filters, with the object support members 17 forming a number of relatively limited openings for the liquid to reach the funnel surface 15. While the drainfield surface 16 is preferably generally horizontal to prevent the objects from sliding, it is also preferably composed of points or relatively limited, single dimensional horizontal surfaces, such that pooling of liquid on the drainfield surface 16 does not occur. Additionally, it is preferred that the distances between the object support members 17 be relatively small and that the drainfield surface 16 formed by the upper surfaces of object support members 17 have limited open areas when measured in a linear direction, in order that relatively thin objects placed onto the drainfield surface 16 will remain on the surface and not drop down to the funnel surface 15. In the embodiment shown, drainfield surface 16 is formed by the combination of the linear upper surfaces 32 of peaked ridges 31, such that the actual horizontal components of drainfield surface 16 are a number of thin lines. The ridges 31 are configured in a zig-zag form, such that there is only a limited linear opening to the funnel surface 15 at any given point. As shown in FIG. 2, the longest linear opening 99 to the funnel surface is less than 4.5 inches, with most linear openings 98 between ridges 31 being less than 3.5 inches, on a funnel 100 sized for a 55 gallon drum 101. The ridges 31 extend generally laterally from opposite sides of lip 18, such that the height of a ridge 31 above funnel surface 15 is at its minimum near the lip 18 but at its maximum near the juncture. The ends of the ridges 31 extending from one side do not contact the ends of the ridges 31 extending from the other side, thus allowing liquid to flow down the juncture to spout 14, but preferably do extend to or overlap the juncture. In this manner there is also no long linear opening to the funnel surface 16 along the juncture. It is also possible for the object support members 17 to be constructed from other shapes, such as arcuate or even columnar, so long as linear openings are kept to a minimum and there is no blockage to the slope of the funnel surface 15 which impedes flow of liquid to the spout 14.

In the preferred embodiment as shown in FIGS. 2, the object support members 17 are positioned to create neck receiving areas 19. By alternating the ends of ridges 31 along the juncture where the ridges 31 are at their maximum height, three adjacent ridges 31 form a bottle neck receiving area 19 and a three point support for the shoulders of a bottle having an elongated neck, such as for example the plastic containers in which motor oil is packaged, the object support members 17 positioning the bottle in an inverted position for draining. In this embodiment, the drainfield funnel 100 is suitable for unattended draining of both flat topped containers and necked containers.

Another feature of the drainfield funnel 100 useful in the field is the addition of lid securing means 27, as lids are utilized with many funnels of this nature. As shown, lid securing means 27 comprise ridges adapted to mate with channels cut into the interior lip of a lid (not shown). Other connecting means of any type known in the art could be incorporated into drainfield funnel 100 as well.

It is understood and contemplated that those skilled in art may recognize substitutions or equivalents to the components of the invention as described above and illustrated. The true scope and definition of the invention therefore is to be as set forth in the following claims.

We claim:

1. A drainfield funnel comprising:
   (A) an off-center spout extending through a generally circular bottom;
   (B) a sloping funnel surface located above said bottom and adapted to direct liquids to said spout;

(C) said bottom containing an annular first drum rim receiving channel and an annular second drum rim receiving channel, where said first receiving channel and said second receiving channel have different center points and a single intersection, and where the distance between said spout and said intersection is shorter than the distance between said spout and any other point on said first receiving channel or said second receiving channel.

2. The funnel of claim 1, further comprising a perimeter lip.

3. The funnel of claim 1, further comprising a generally horizontal drainfield surface located above said funnel surface and comprised of a number of discrete object support members.

4. The funnel of claim 3, where said object support members comprise ridges having a zig-zag configuration.

5. The funnel of claim 3, where said object support members form neck receiving members adapted to support bottles having elongated necks in an inverted position.

6. The funnel of claim 1, where said funnel surface is comprised of a first slope and a second slope.

7. The funnel of claim 5, where said first slope and said second slope meet at a juncture on a line between the center of said spout and the center of said funnel surface.

8. A drainfield funnel comprising:

(A) a spout having a center;

(B) a sloping funnel surface adapted to direct liquids to said spout, said sloping surface comprising a first slope and a second slope, said first and second slope meeting at a juncture on a line passing through said center of said spout, said sloping surface having a peripheral lip;

(C) a generally horizontal drainfield surface located above said funnel surface and comprised of a number of discrete object support members which act to support objects to be drained and provide openings for liquid from said objects to reach said funnel surface, said object support members being positioned relative to each other such that said openings are limited in linear distance, said object support members comprising a number of ridges having linear upper surfaces in a zig-zag configuration, where some of said ridges extend laterally from one side of said peripheral lip toward said first and second slope juncture and where the remainder of said ridges extend laterally from the opposite side of said peripheral lip toward said first and second slope juncture.

9. The funnel of claim 8, where each of said ridges has an end which extends at least to said juncture.

10. The funnel of claim 9, where said ends of three adjacent said ridges form a neck receiving area adapted to receive the neck of an inverted bottle.

11. A drainfield funnel in combination with either a 55 gallon drum or a 30 gallon drum, each of said drums having an annular rim, a closed generally flat top and an aperture Offset from center for receiving liquids, the drainfield funnel comprising:

(A) a spout adapted to fit within the aperture of either a 55 gallon drum or a 30 gallon drum, said spout extending through a bottom;

(B) a sloping funnel surface located above said bottom and adapted to direct liquids to said spout and surrounded by a perimeter lip;

(C) said bottom containing an annular first drum rim receiving recess and an annular second drum rim receiving recess, said first receiving recess being sized to correspond to the drum rim of a 55 gallon drum, said second receiving recess being sized to correspond to the drum rim of a 30 gallon drum, where said first receiving recess and said second receiving recess have a single intersection, where the distance between said spout and said intersection is shorter than the distance between said spout and any other point on said first receiving recess or said second receiving recess; and (D) a generally horizontal drainfield surface located above said funnel surface and comprised of a number of discrete object support members.

12. The funnel of claim 11, where said out diameter of said lip is greater than the outer diameter of a 55 gallon drum.

13. The funnel of claim 11, where said object support members have limited upper surfaces.

14. The funnel of claim 13, where said object support members comprise a number of ridges having a zig-zag configuration.

15. The funnel of claim 11, where said object support members form openings to allow liquids to reach said funnel surface from said drainfield surface, and where said openings are relatively limited in linear distance.

16. The funnel of claim 15, where said linear distance of said opening is less than 4.5 inches.

17. A drainfield funnel comprising:

(A) an off-center spout extending through a bottom;

(B) a sloping funnel surface located above said bottom and adapted to direct liquids to said spout;

(c) said bottom containing a circular first drum rim receiving recess and a circular second drum rim receiving recess, where said first receiving recess and said second receiving recess have a single intersection and encircle said spout, where the distance between said spout and said intersection is shorter than the distance between said spout and any other point on said first receiving recess or said second receiving recess.

18. The funnel of claim 17, further comprising a generally horizontal drainfield surface located above said funnel surface and comprised of a number of discrete object support members.

19. The funnel of claim 18, wherein said object support members comprise ridges having a zig-zag configuration.

20. The funnel of claim 19, where said object support members form neck receiving form neck receiving members adapted to support bottles having elongated necks in an inverted position.

21. The funnel of claim 17, where said funnel surface is comprised of a first slope and a second slope.

\* \* \* \* \*